United States Patent
Sugawa

(10) Patent No.: US 12,523,559 B2
(45) Date of Patent: Jan. 13, 2026

(54) ELECTROSTATIC CAPACITIVE PRESSURE SENSOR FOR FLUID PRESSURE DETECTION

(71) Applicants: TOHOKU UNIVERSITY, Miyagi (JP); FUJIKIN INCORPORATED, Osaka (JP)

(72) Inventor: Shigetoshi Sugawa, Miyagi (JP)

(73) Assignees: TOHOKU UNIVERSITY, Miyagi (JP); FUJIKIN INCORPORATED, Osaka (JP)

(*) Notice: Subject to any disclaimer, the term of this patent is extended or adjusted under 35 U.S.C. 154(b) by 274 days.

(21) Appl. No.: 18/282,885

(22) PCT Filed: Feb. 28, 2022

(86) PCT No.: PCT/JP2022/008151
§ 371 (c)(1),
(2) Date: Sep. 19, 2023

(87) PCT Pub. No.: WO2022/202115
PCT Pub. Date: Sep. 29, 2022

(65) Prior Publication Data
US 2024/0175774 A1      May 30, 2024

(30) Foreign Application Priority Data
Mar. 26, 2021   (JP) ................. 2021-053066

(51) Int. Cl.
*G01L 9/00*   (2006.01)
(52) U.S. Cl.
CPC .................. *G01L 9/0072* (2013.01)
(58) Field of Classification Search
None
See application file for complete search history.

(56) References Cited

U.S. PATENT DOCUMENTS 5,965,821 A    10/1999  Grudzien
8,079,269 B2 * 12/2011  Chakraborty ......... G01L 9/0072
                                                 361/283.4

(Continued)

FOREIGN PATENT DOCUMENTS

JP    11-258092    9/1999
JP    2001-509585  7/2001

(Continued)

OTHER PUBLICATIONS

Takehisa Hata, "Small Electrostatic Capacitive Pressure Sensor", Readout, May 2010, No. 36, pp. 10-13, along with an English abstract thereof.

(Continued)

*Primary Examiner* — Eric S. McCall
*Assistant Examiner* — Nigel H Plumb
(74) *Attorney, Agent, or Firm* — Greenblum & Bernstein, P.L.C.

(57) ABSTRACT

An electrostatic capacitive pressure sensor including a reference chamber provided between a fixed electrode and a movable electrode that deflects in accordance with fluid pressure, a measurement chamber filled with a fluid for causing deflection of the movable electrode, a means for sequentially applying a first potential and a second potential to the fixed electrode and generating a first output signal corresponding to the first potential and a second output signal corresponding to the second potential, and a means for generating a difference signal between the first output signal and the second output signal.

4 Claims, 13 Drawing Sheets

(56) References Cited

U.S. PATENT DOCUMENTS

| | | | |
|---|---|---|---|
| 8,997,548 B2* | 4/2015 | Ferran | G01L 27/005 73/1.66 |
| 9,772,245 B2* | 9/2017 | Besling | G01L 9/0045 |
| 2003/0015040 A1 | 1/2003 | Ishio et al. | |
| 2006/0161364 A1 | 7/2006 | Wang et al. | |
| 2013/0118265 A1* | 5/2013 | Besling | G01L 9/125 216/13 |
| 2014/0062258 A1 | 3/2014 | Koyama et al. | |
| 2014/0208822 A1 | 7/2014 | Ferran et al. | |
| 2019/0064022 A1 | 2/2019 | Strietzel | |

FOREIGN PATENT DOCUMENTS

| | | | |
|---|---|---|---|
| JP | 2003-28740 | 1/2003 | |
| JP | 2008-527329 | 7/2008 | |
| JP | 2016-505145 | 2/2016 | |
| JP | 2017-133841 | 8/2017 | |
| JP | 2019-510239 | 4/2019 | |
| WO | WO-2006073770 A1 * | 7/2006 | G01L 9/0072 |

OTHER PUBLICATIONS

International Search Report Issued in International Patent Application No. PCT/JP2022/008151, dated Apr. 26, 2022, along with an English translation thereof.

* cited by examiner

[fig.1A]
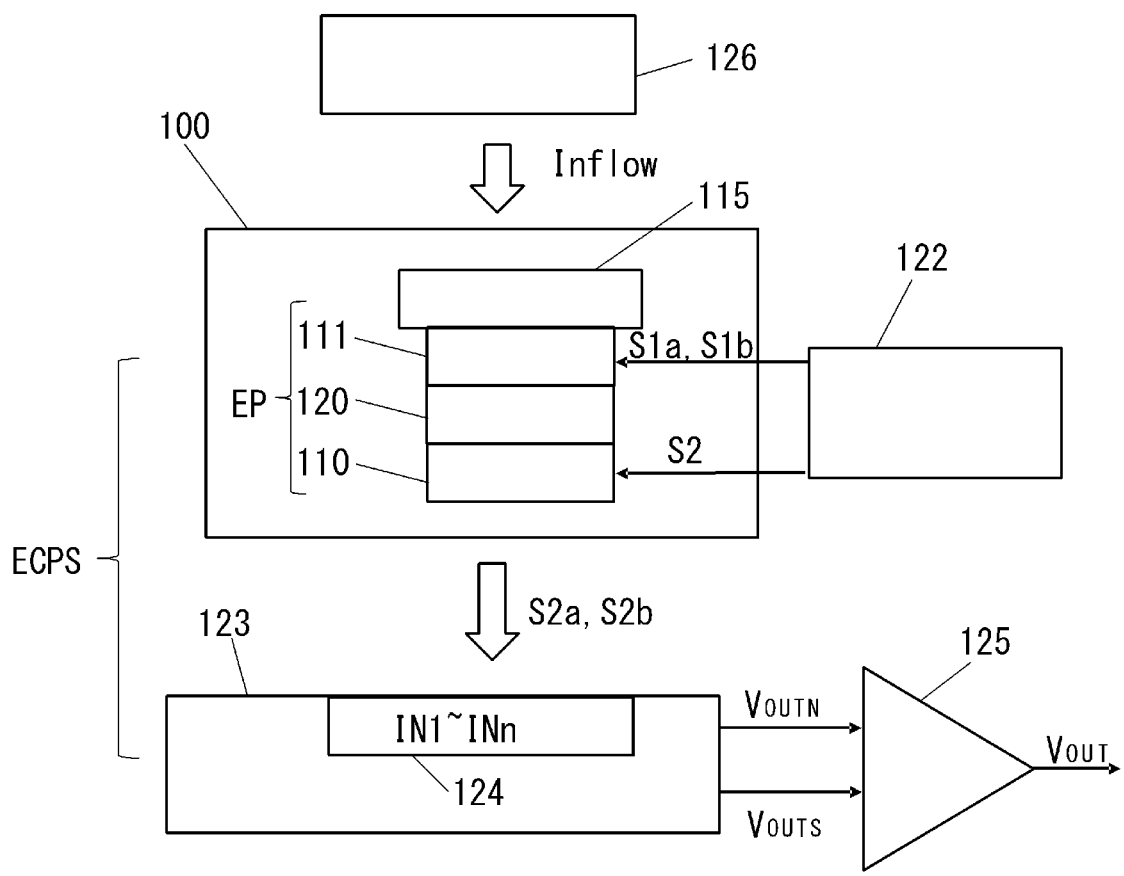

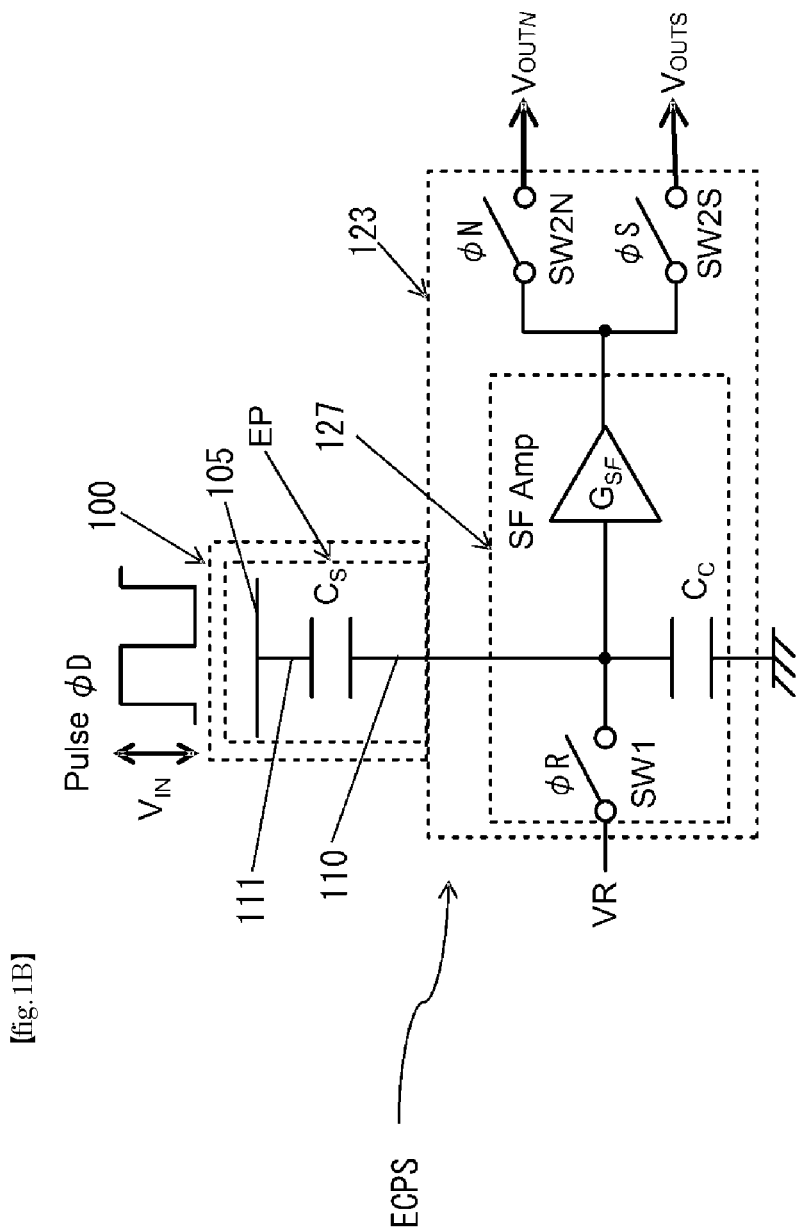
[fig.1B]

[fig.1C]
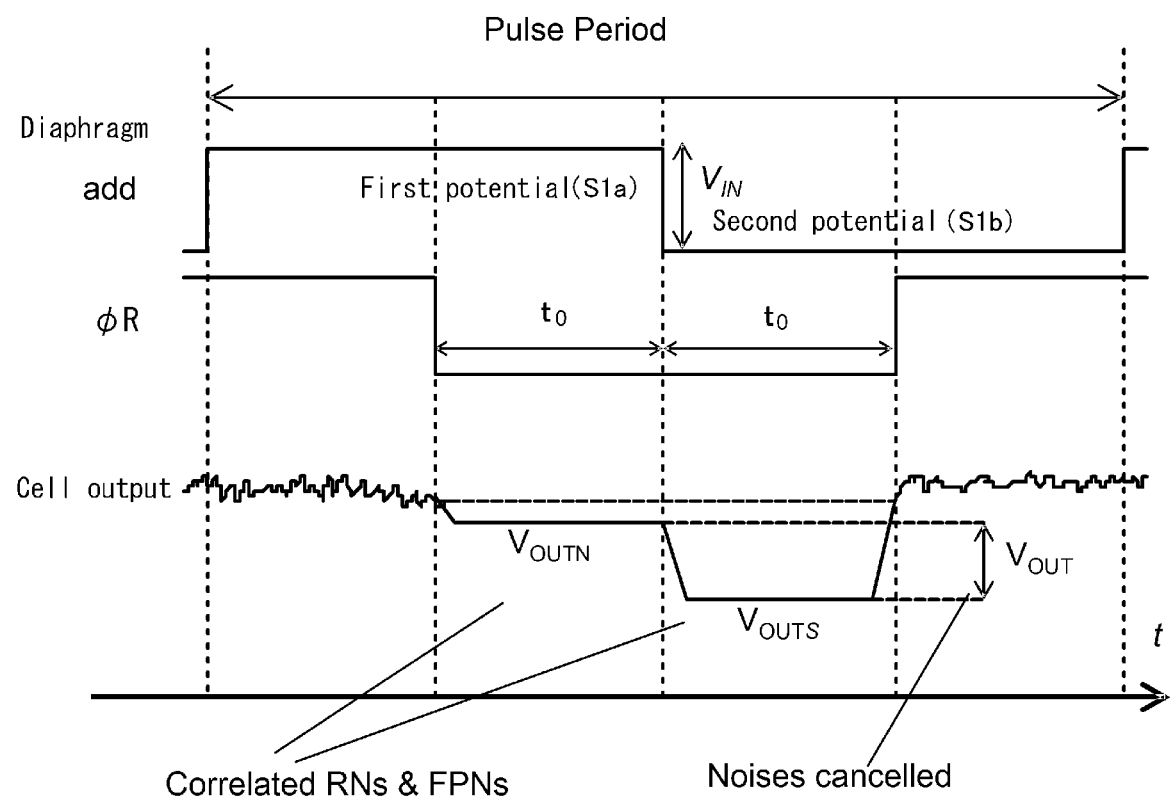

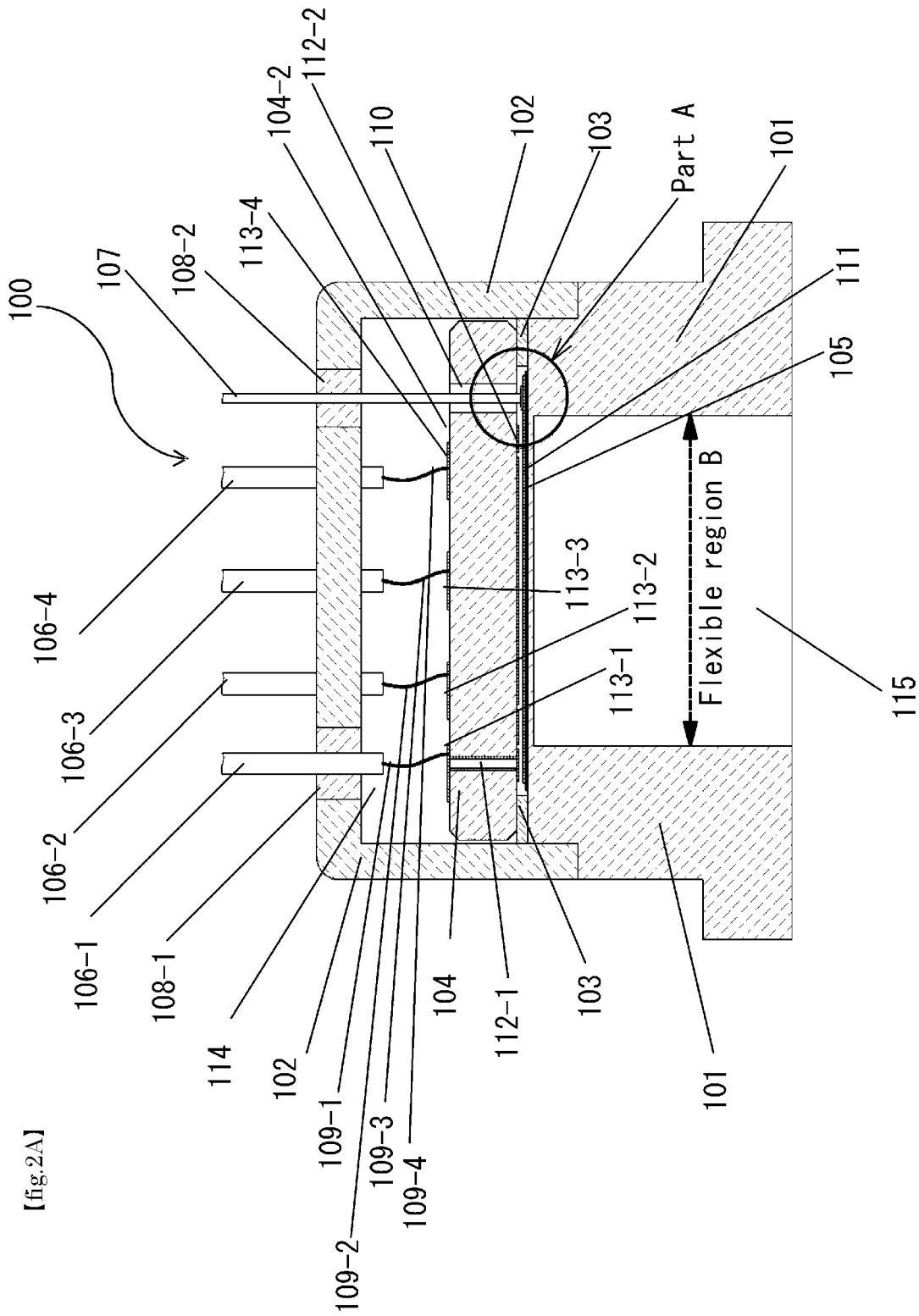
[fig.2A]

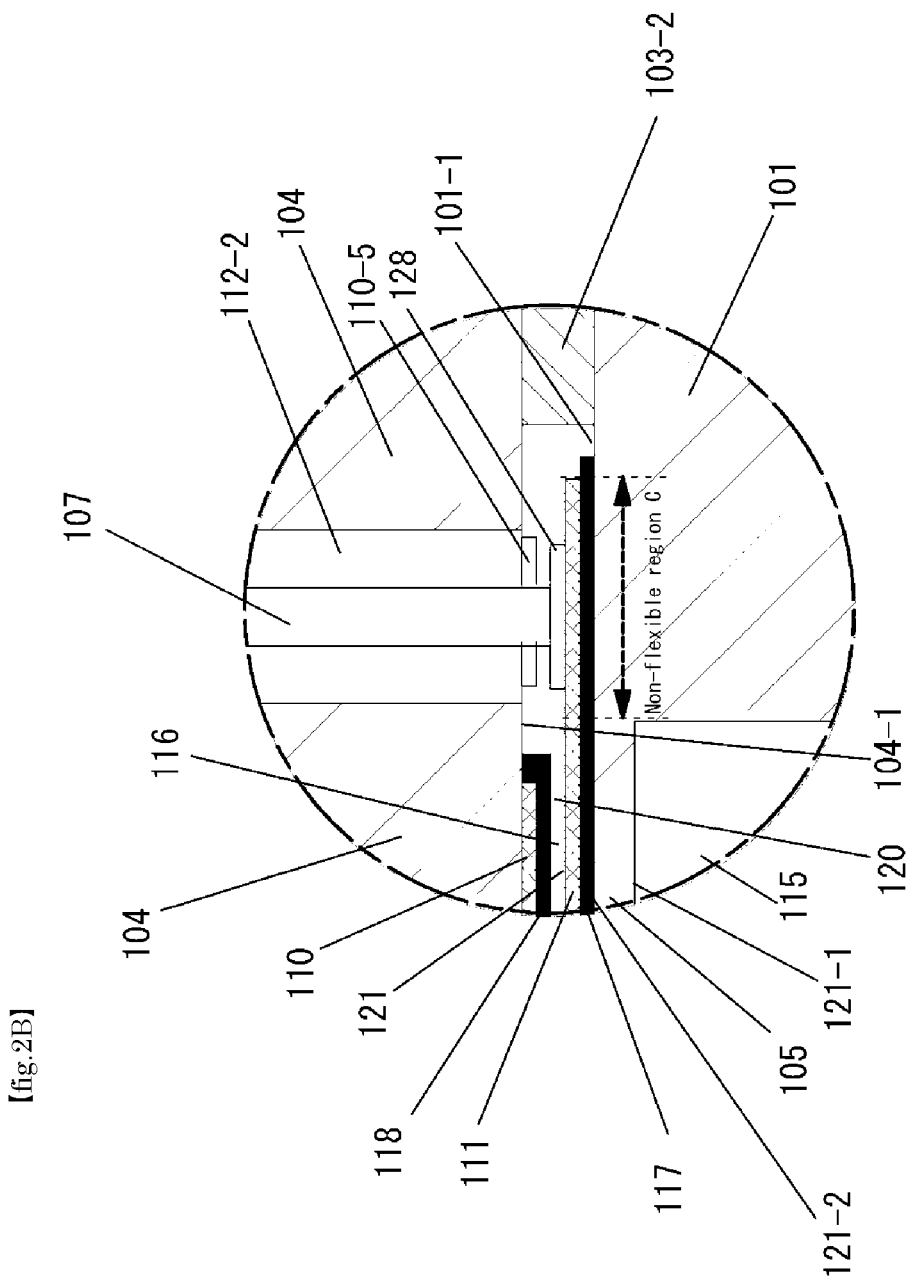
[fig.2B]

[fig.2C]
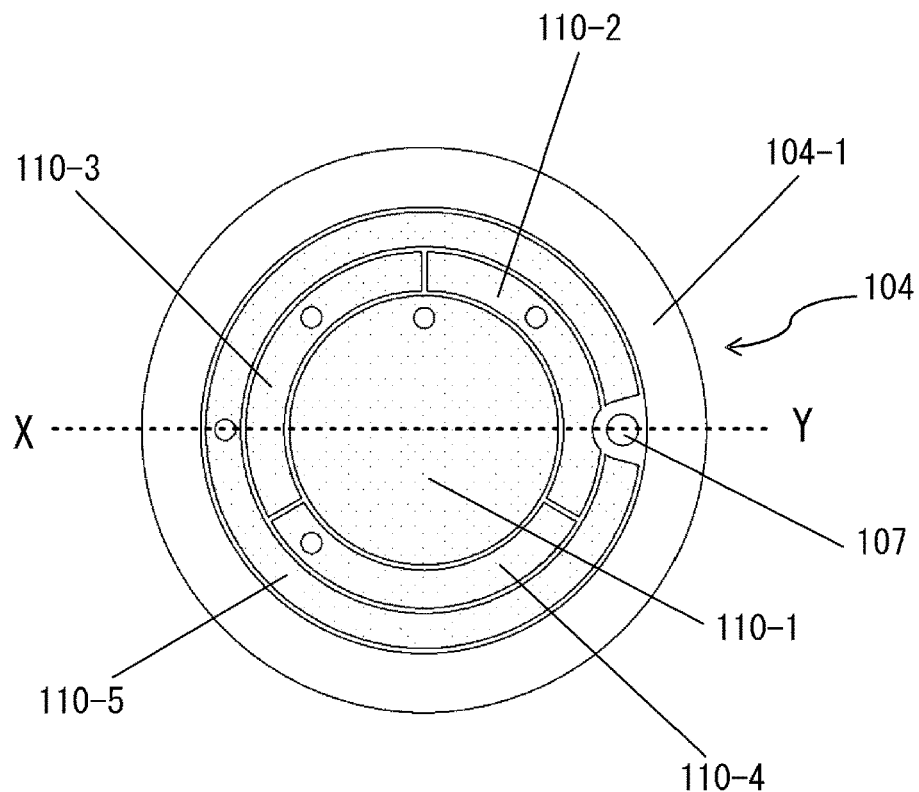
[fig.2D]
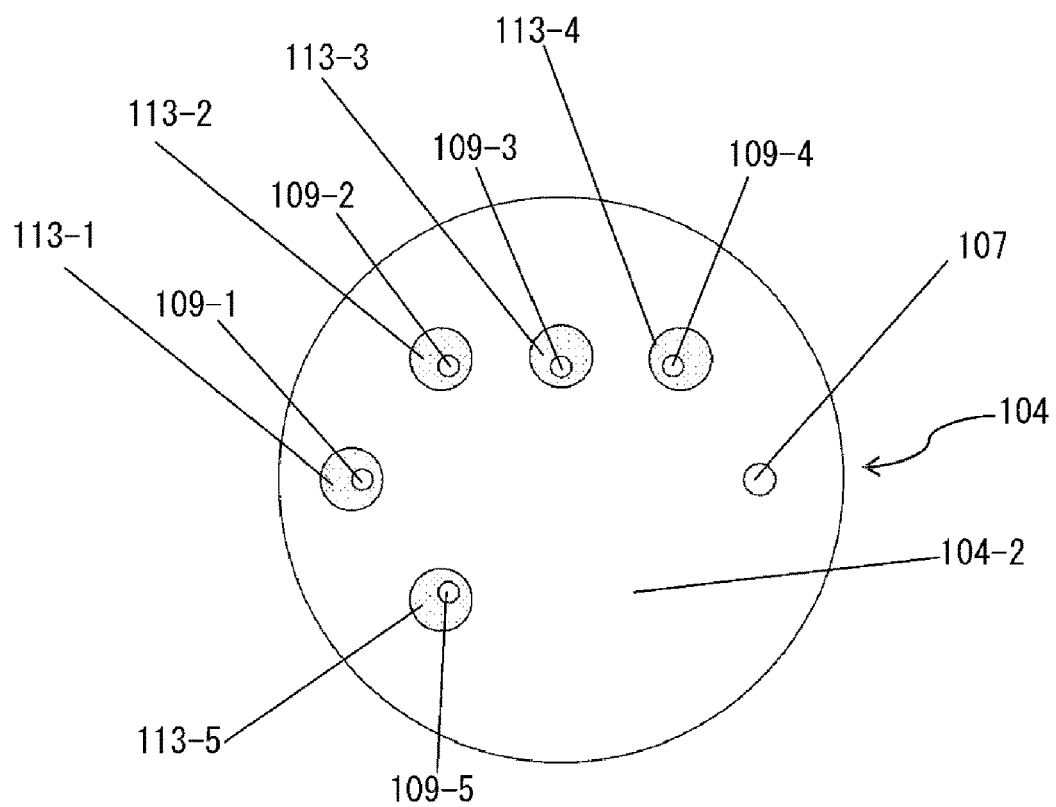

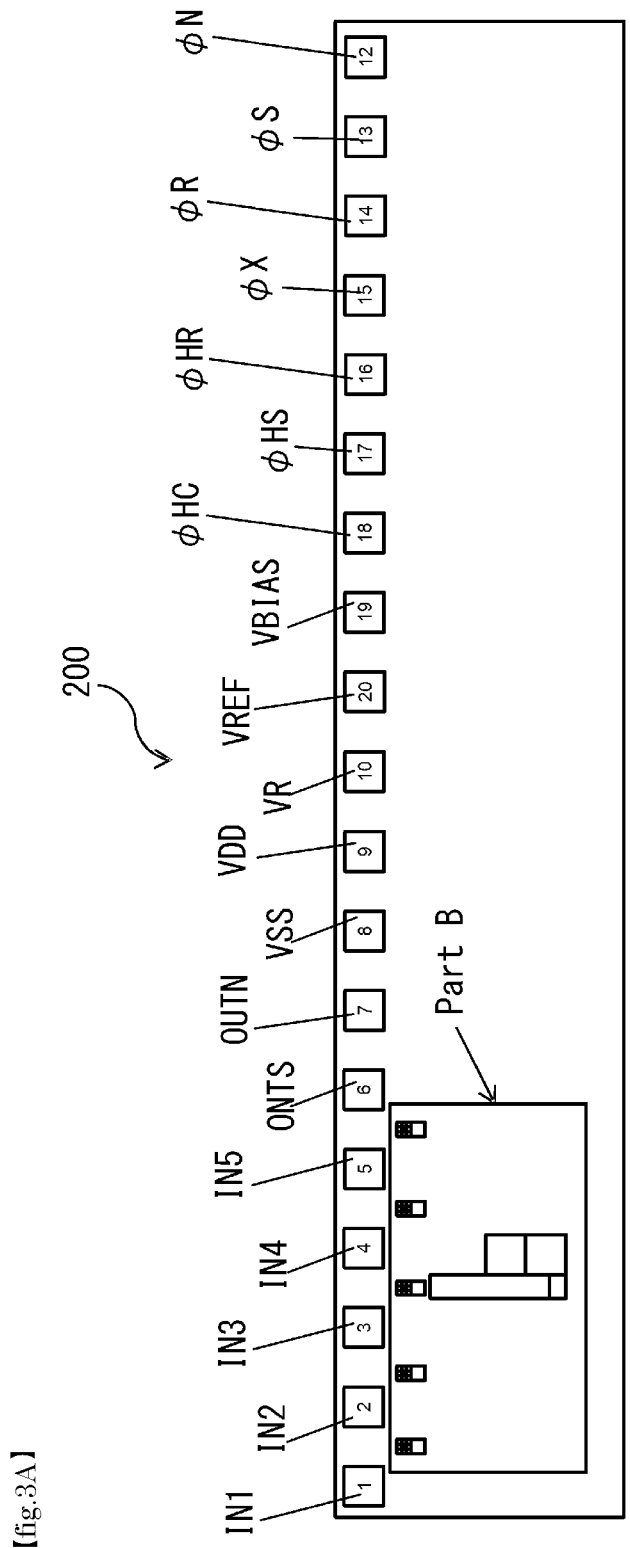

[fig.3B]
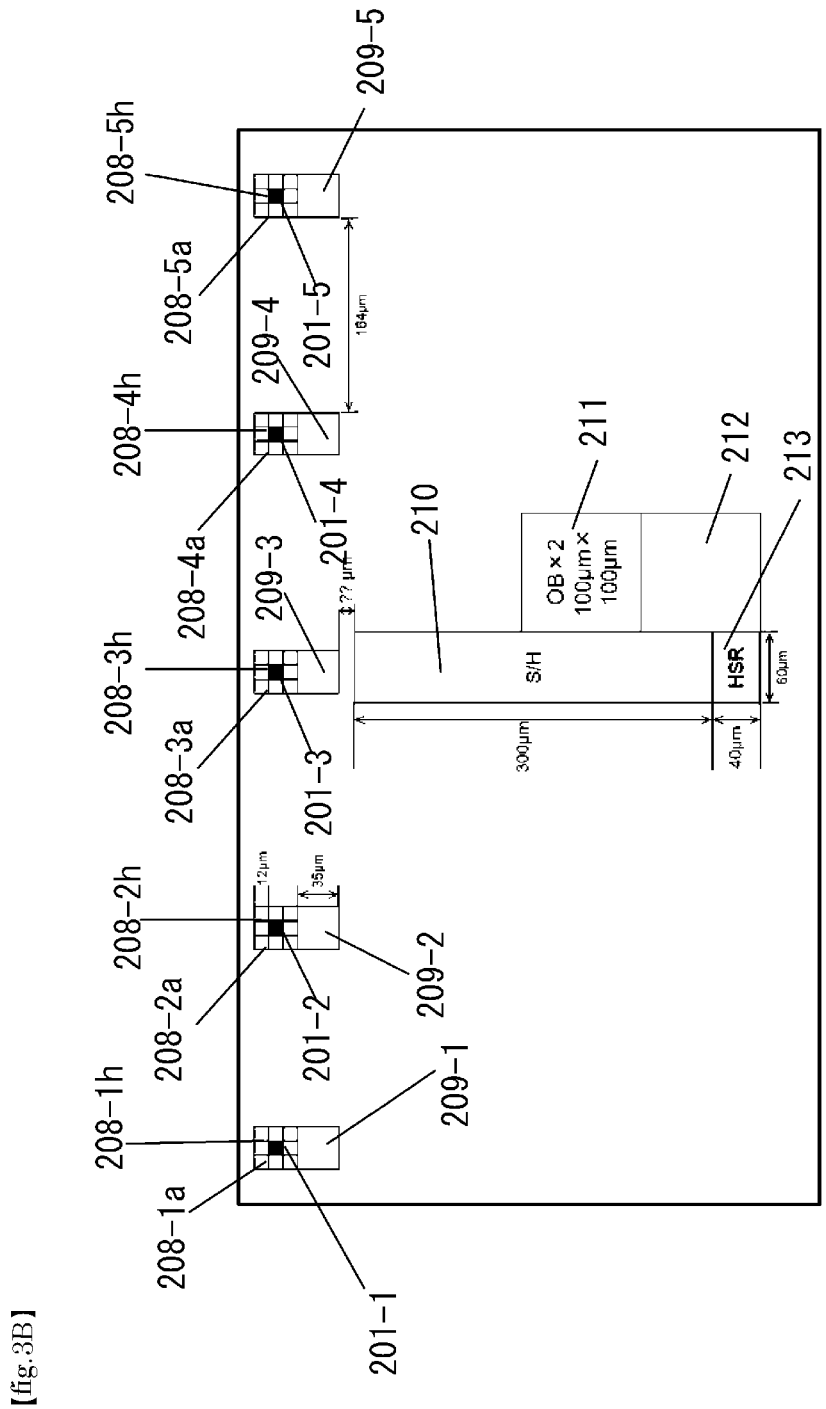

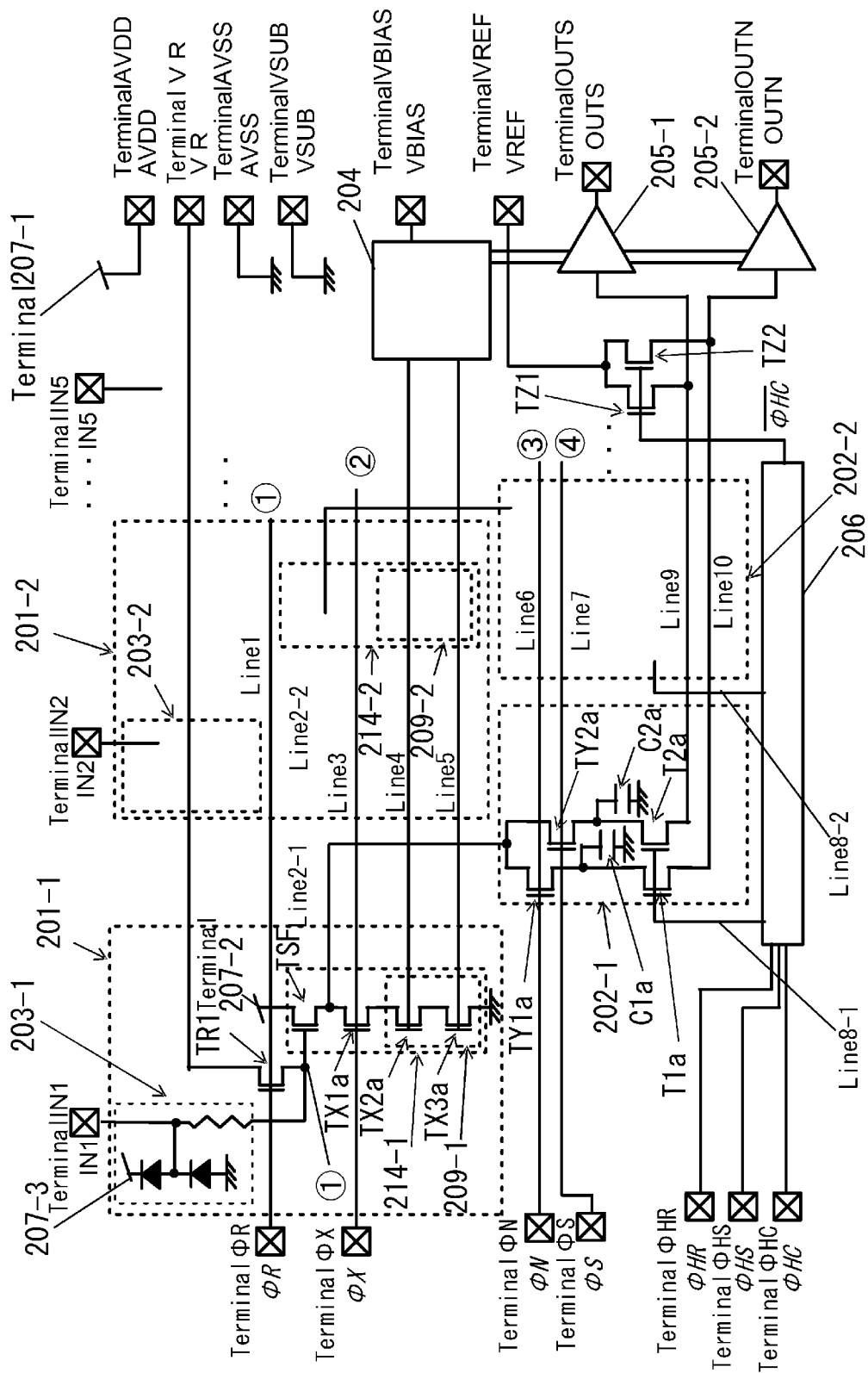
[fig.3C]

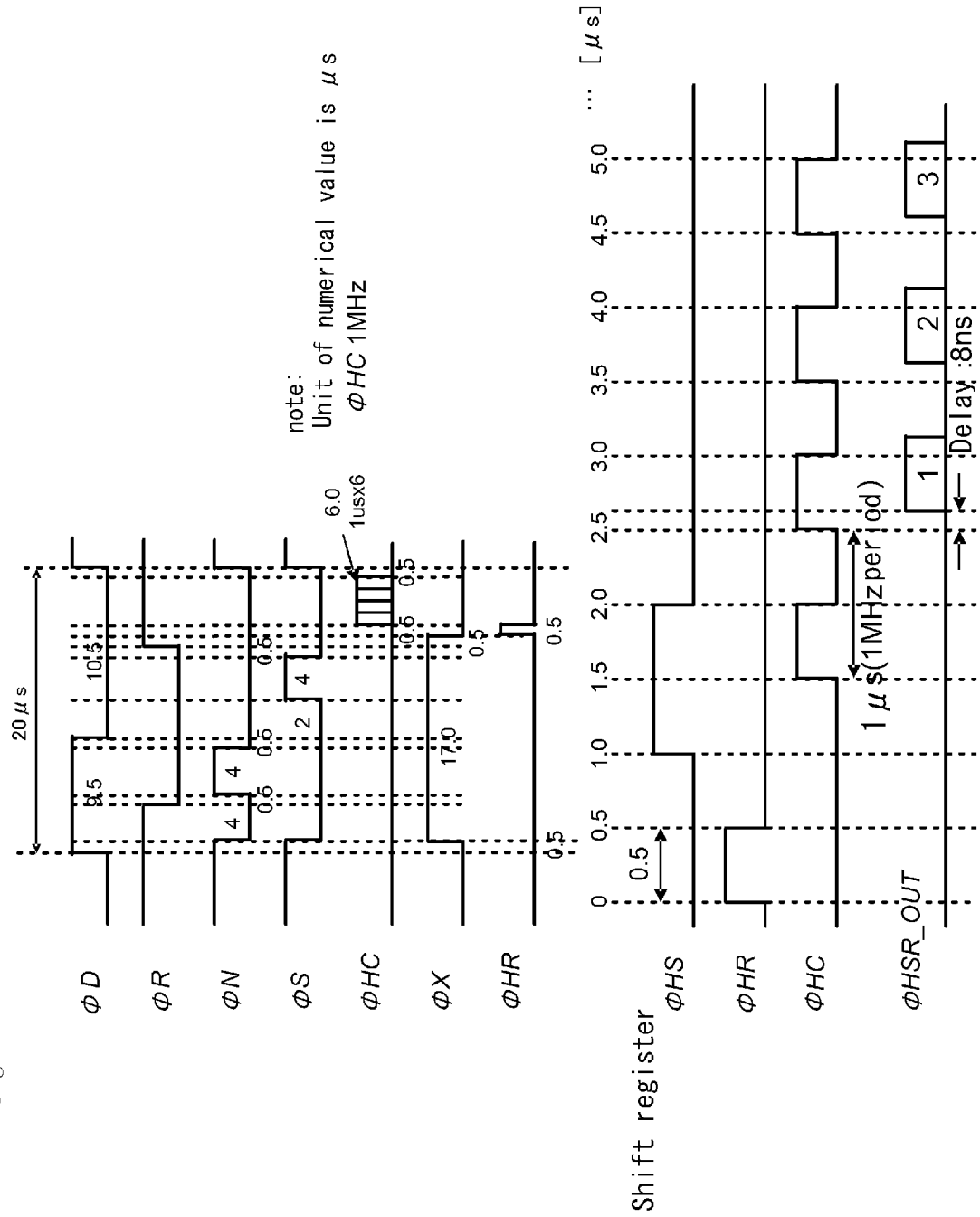

[fig.3E]
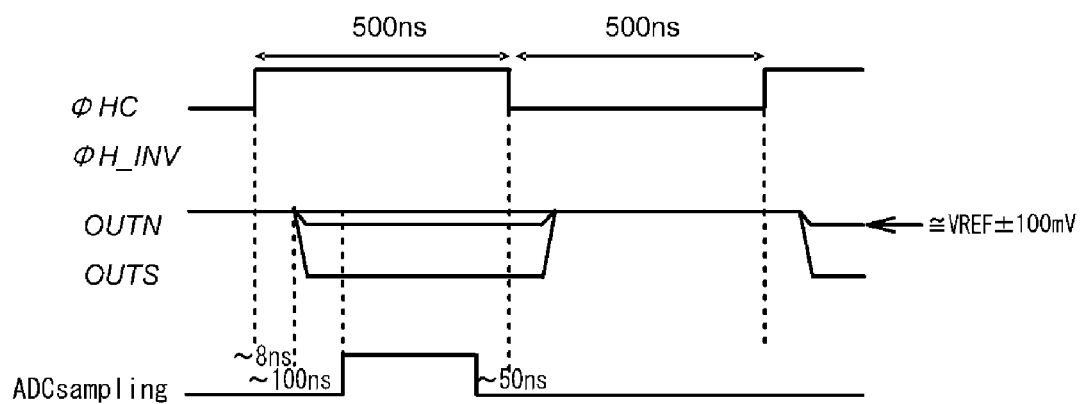

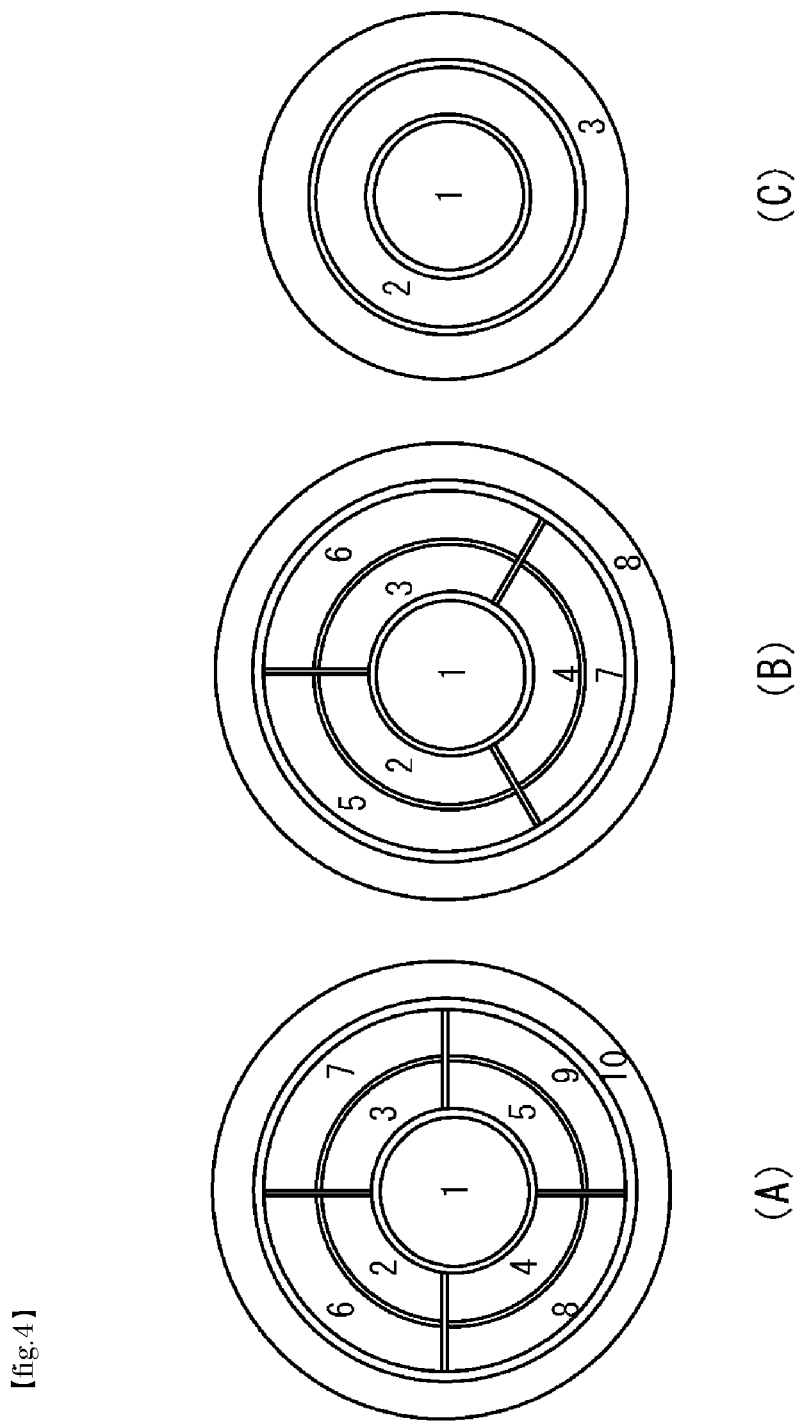
[fig.4]

[fig.5]
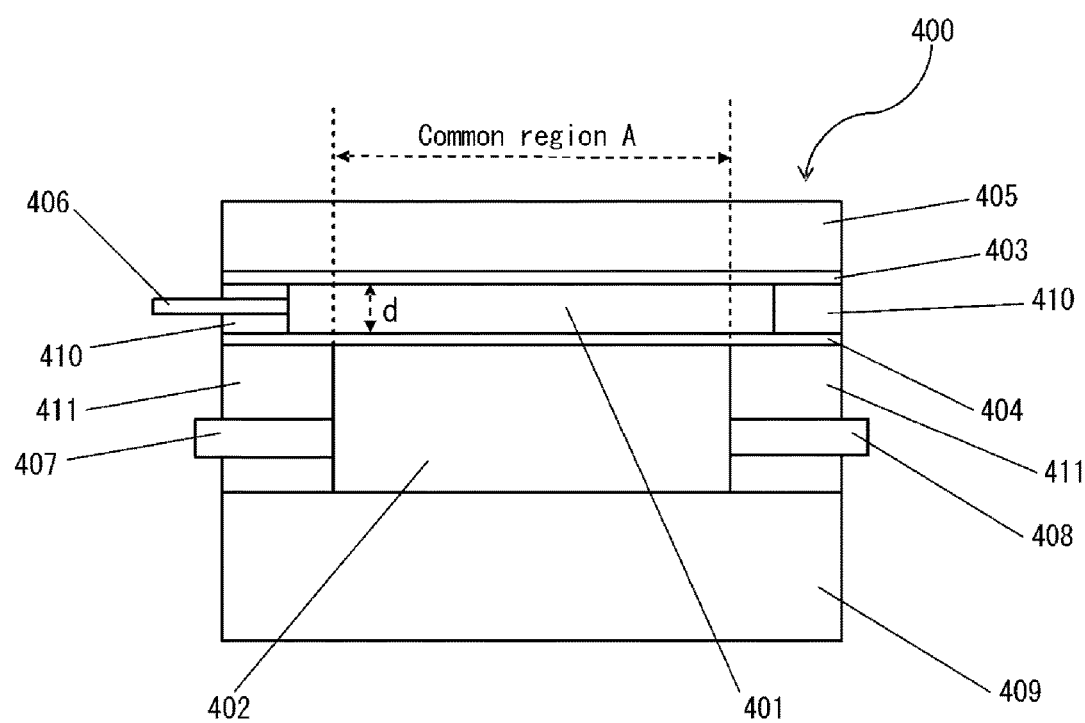
Prior Art

ELECTROSTATIC CAPACITIVE PRESSURE SENSOR FOR FLUID PRESSURE DETECTION

TECHNICAL FIELD

The present invention relates to an electrostatic capacitive pressure sensor used to measure the pressure of a fluid (liquid or gas) by a variable capacitor and a pressure detection method using the electrostatic capacitive pressure sensor.

BACKGROUND ART

In modern industrial products that have become multi-functional, sophisticated, and complicated, sensing technology that captures physical phenomena and states and converts them to signals is one of the most fundamental and important technologies. Among them, various flow rate and pressure control devices such as mass flow controllers are used in manufacturing processes for semiconductors, FPDs, LEDs, solar panels, etc. (hereinafter, these manufacturing processes are represented by "semiconductor device manufacturing method (process)"), in which many gases and liquids are controlled, and pressure sensors that can be mounted on these devices are one of the key parts.

In a semiconductor device manufacturing process, various film forming apparatuses by vapor phase growth are used. In such a film forming device, in order to form a thin film having a thickness in units of nm, it is essential to accurately detect (measure) the pressure in the film forming chamber, the partial pressure of the source gas, and the like in order to accurately control them. In order to detect such a pressure, an electrostatic capacitive pressure sensor is used (Patent Literature 1, 2, 3, Technical Document 1). In this type of pressure sensor, a displacement caused by a deflection of a diaphragm caused by a pressure of a fluid to be measured is directly converted into an electric signal, and a pressure of the fluid is measured. An example of a known design of the sensor head of such a capacitive sensor is shown in FIG. 5. The sensor head 400 of the electrostatic capacitive pressure sensor shown in FIG. 5 has a housing (not shown) defining an interior (second) chamber 402 for receiving a fluid in which pressure is sensed, an inlet 407 and an outlet 408.

Within a housing, first and second conductive electrodes 403, 404 are mounted substantially parallel to each other and are spaced apart from each other by a small gap d to form a parallel plate capacitor. A first electrode (fixed electrode) 403 is fixed to a spacer 410. On the other hand, a second electrode (movable electrode) 404 is movable relative to the first electrode 403 so as to be responsive to a received fluid.

The first electrode 403 is formed on a support disk 405 made of, for example, ceramic. The second electrode 404 is also a diaphragm formed of a metal such as an alloy of nickel, chromium, and iron.

The movable second electrode 404 may be provided on a surface of a separately prepared diaphragm (surface on a side of a first chamber 401), whose periphery is typically clamped by a second spacer 411.

The second electrode 404 being clamped extends in the width direction of the sensor head 400 and defines a first chamber 401 and a second chamber 402.

The first chamber 401 is formed by defining the upper inner wall and the lower inner wall by the first electrode 403 and the second electrode 404 fixed to the first spacer 410 into which the reference inlet 406 is fitted.

The second chamber 402 has an inlet 407 for receiving a fluid to be measured and the central portion of the second electrode 404 (diaphragm) is deflected in response to a pressure change of the fluid. The displacement movement of the surface of the second electrode 404 due to this deflection changes a gap d between the electrodes. An electrical signal is applied to the first electrode 403 (the movable second electrode 404 is typically grounded) such that a change in capacitance between the first electrode 403 and the second electrode 404 is sensed and associated with the pressure of the fluid filling the second chamber 402.

In the pressure sensor provided with the sensor head 400 shown in FIG. 5, the second electrode 404 has a function of a diaphragm, but the second electrode 404 may be separately provided on a surface (a surface on the side of the first chamber 401) of a diaphragm formed of a separate member or a homogeneous member. In this case, the diaphragm may be formed of an insulator such as ceramic in addition to metal.

The second chamber 402 is provided with an outlet 408 for outflow of the fluid filling the second chamber 402. The fluid in the second chamber 402 may be flowing (in a moving state) or may be in a stationary state during the pressure detection, and pressure detection is possible in both states.

In order to carefully sense the pressure of the fluid and to obtain an accurate resolution, it is necessary to sense a change in the gap d, that is, a change in capacitance, with sufficient resolution.

For that purpose, it is conceivable that the size of the diaphragm (second electrode 404) is sufficiently large, but it is inevitable that it becomes one of the factors that hinder the miniaturization of the pressure sensor itself. Alternatively, if the diaphragm (second electrode 404) is made smaller in an attempt to miniaturize the pressure sensor, the gap d between the electrodes must also be made smaller. The mathematical representation of this point is as follows.

It is known that a parallel plate capacitor satisfies the following equation:

$$C = eA/d \qquad (1)$$

where C is a capacitance, e is a material-based constant between the plates (e=1 for vacuum), A is a common region of the parallel plates (the region/area where the parallel plates act as capacitors), and d is a gap.

This means that the change in capacitance corresponding to the change in gap is represented by the following equation:

$$d(C)/d(d) = -eAd^{-2} \qquad (2).$$

Since the measurement accuracy is improved as the output of the capacitance given in Equation (1) is larger, it is advantageous that the electrode area of the cell, that is, the common region A is larger, but this leads to an increase in the size of the sensor and a decrease in the spatial resolution.

On the other hand, as Equation (2) shows, as the common region A decreases, it becomes difficult to accurately detect a change in d(C)/d(d). That is, if the common region A is made small, the pressure sensor can be miniaturized, but in order to achieve accurate sensing of the pressure, the gap d (inter-electrode distance) must be made very narrow, and it is necessary to accurately sense a change in capacitance due to a change in the narrow gap d.

In addition, when the gap d (inter-electrode distance) is reduced, the deformable amount is reduced, and not only the flexibility is impaired, but also the pressure range (dynamic range) that can be measured is narrowed because the gap d (inter-electrode distance) is easily bottomed.

As can be seen from the above discussion, the measurement accuracy can be improved by any of the above methods, but each of them has advantages and disadvantages, and it is difficult to satisfy all requirements of high measurement accuracy, high resolution (high sensitivity), wide dynamic range, and small size with a conventional electrostatic capacitive pressure sensor.

In addition, in many of the conventional electrostatic capacitive pressure sensors, the capacitance is detected by measuring the current flowing when the high-frequency AC signal is applied, during the signal sampling, it is difficult to eliminate the influence of the distortion of the signal due to the phase difference of the charge and discharge and the response delay of the detection circuit.

Further, today, in the semiconductor device manufacturing method, the film thickness and quality uniformity are further advanced in the process of further miniaturization from now on, more highly accurate process is required, and practical realization of an optimum electrostatic capacitive pressure sensor and a pressure detection method using the pressure sensor satisfying the demand is strongly desired.

PATENT LITERATURE

PTL 1: Japanese Laid-Open Patent Application No. 2001-509585
PTL 2: Japanese Laid-Open Patent Application No. 2019-51023
PTL 3: Japanese Laid-Open Patent Application No. 2017-133841

NON-PATENT LITERATURE

NPL 1: Feature Article special article "Small Electrostatic Capacitive Pressure Sensor" by Takehisa Hata, Readout pp 10-13, No. 36, May 2010

SUMMARY OF INVENTION

Technical Problem

The present invention has been made in view of the above, and one of the main objects thereof is to provide an electrostatic capacitive pressure sensor capable of detecting (detecting/measuring) the pressure of a fluid with higher accuracy even in a dynamic state or a static state, capable of further miniaturization, and having a wider pressure detection range (wide dynamic range), and a pressure detection method using the same.

Solution to Problem

An aspect of the present invention resides in an electrostatic capacitive pressure sensor comprising: a fixed electrode and a movable electrode which is arranged opposite to the fixed electrode and deflects in accordance with a pressure of a fluid; a reference chamber provided between the electrodes; and a measurement chamber filled with the fluid for causing deflection of the movable electrode, the electrostatic capacitive pressure sensor configured to measure the pressure of the fluid by directly converting an amount of change in a capacitance between both electrodes which changes in accordance with a movable displacement of the movable electrode to an electric signal,
the electrostatic capacitive pressure sensor further comprising:
a means for sequentially applying a first potential and a second potential to the movable electrode and generating a first output signal corresponding to the first potential and a second output signal corresponding to the second potential; and
a means for generating a difference signal between the first output signal and the second output signal.

Another aspect of the present invention resides in the electrostatic capacitive pressure sensor, wherein the movable electrode is formed on an insulating layer.

Still another aspect of the present invention resides in the electrostatic capacitive pressure sensor, wherein an insulating film is provided on a surface of the fixed electrode.

Further aspect of the present invention resides in a fluid pressure detection method using an electrostatic capacitive pressure sensor comprising a fixed electrode and a movable electrode which is arranged opposite to the fixed electrode and deflects in accordance with a pressure of a fluid, a reference chamber provided between the electrodes, and a measurement chamber filled with the fluid for causing a deflection of the movable electrode, the electrostatic capacitive pressure sensor configured to measure the pressure of the fluid by directly converting an amount of change in a capacitance between both electrodes which changes in accordance with a movable displacement of the movable electrode to an electric signal,
the method comprising:
filling the measurement chamber with a fluid whose pressure is to be detected,
sequentially applying a first potential and a second potential to the movable electrode, generating a first output signal corresponding to the first potential and a second output signal corresponding to the second potential, generating a difference signal between the first output signal and the second output signal, and detecting a pressure of the fluid whose pressure is to be detected based on the difference signal.

Advantageous Effects of Invention

According to the present invention, it is possible to provide an electrostatic capacitive pressure sensor and a pressure detection method using the electrostatic capacitive pressure sensor, which can detect and measure the pressure of a fluid with higher accuracy both in a dynamic state and a static state, and in addition, have a wide pressure detection range and a wide dynamic range, and can be further miniaturized.

In addition, even when a diaphragm made of a material having low flexibility is used, a sensor having a wide dynamic range can be realized because of its high resolution. Therefore, the selection range of the material of the diaphragm can be widened, and high-precision measurement can be easily performed because of the high resolution.

Other features and advantages of the present invention will become apparent from the following description referring to the accompanying drawings. In the accompanying drawings, the same or similar components are denoted by the same reference numerals.

BRIEF DESCRIPTION OF DRAWINGS

The accompanying drawings, which are incorporated in and constitute a part of SPECIFICATION, illustrate embodiments of the invention and, together with the description, serve to explain the principles of the invention.

FIG. 1A is a conceptual block diagram. It is a diagram for explaining an embodiment of the present invention.

FIG. 1B is a schematic circuit diagram for explaining the principle of capacitance detection. It is a diagram for explaining an embodiment of the present invention.

FIG. 1C is a timing chart. It is a diagram for explaining an embodiment of the present invention.

FIG. 2A is a schematic cross-sectional view taken along the line XY shown in FIG. 2C. It is a diagram for explaining one preferred embodiment of a sensor head of an electrostatic capacitive pressure sensor of the present invention.

FIG. 2B is a schematic enlarged view of a part A shown in the frame in FIG. 2A. It is a diagram for explaining one preferred embodiment of a sensor head of an electrostatic capacitive pressure sensor of the present invention.

FIG. 2C is a schematic plan view for explaining a diaphragm side surface of an insulator. It is a diagram for explaining one preferred embodiment of a sensor head of an electrostatic capacitive pressure sensor of the present invention.

FIG. 2D is a schematic plan view for explaining the surface of the insulator on a side where an electrode pad is arranged. It is a diagram for explaining one preferred embodiment of a sensor head of an electrostatic capacitive pressure sensor of the present invention.

FIG. 3A is a schematic block layout diagram of an IC sensor chip. It is a diagram for explaining one preferred embodiment of an IC sensor chip according to the present invention.

FIG. 3B is s schematic enlarged view of a part B shown in the frame in FIG. 3A. It is a diagram for explaining one preferred embodiment of an IC sensor chip according to the present invention.

FIG. 3C is a schematic circuit diagram. It is a diagram for explaining one preferred embodiment of an IC sensor chip according to the present invention.

FIG. 3D is a timing chart for explaining a driving timing. It is a diagram for explaining one preferred embodiment of an IC sensor chip according to the present invention.

FIG. 3E is a timing chart for explaining a sampling timing of ADC. It is a diagram for explaining one preferred embodiment of an IC sensor chip according to the present invention.

FIG. 4 is a schematic explanatory view for explaining another preferred embodiment of the shape and arrangement of detection electrodes in the sensor head according to the present invention.

FIG. 5 is a schematic structural diagram for explaining a typical example of a conventional sensor head of an electrostatic capacitive pressure sensor.

DESCRIPTION OF EMBODIMENTS

Hereinafter, the present invention will be described in detail with reference to the drawings as necessary in order to facilitate understanding of the present invention.

FIG. 1A to FIG. C are diagrams for describing embodiments of the present invention.

FIG. 1A is a conceptual block diagram, FIG. 1B is a schematic circuit diagram for explaining the principles of capacitance sensing, and FIG. 1C is a timing chart.

FIG. 1A shows an outline of the configuration of an embodiment of the present invention.

The electrostatic capacitive pressure sensor ECPS includes a sensor head 100 and a signal processing unit 123.

The sensor head 100 has an electrode portion EP. The electrode portion EP includes a fixed electrode 110, a movable electrode 111, a reference chamber 120 formed between the fixed electrode 110 and the movable electrode 111, and a measurement chamber 115 that is deformed in accordance with the pressure of a fluid to cause movable displacement of the movable electrode 111 to thereby change the capacitance of the reference chamber 120 in order to sense the pressure of the fluid.

As shown in FIG. 1B, the signal processing unit 123 includes a capacitance detector circuit 127.

The fixed electrode 110 and the movable electrode 111 form a type of parallel-plate capacitor (capacitance Cs).

The movable electrode 111 may be a diaphragm constituting one wall of the measurement chamber 115 (first configuration), or may be separately provided on a surface of the diaphragm (second configuration).

The first configuration is a configuration in which both the diaphragm and the electrode functions are provided by one element, and the second configuration is a configuration in which separate elements provide the diaphragm function and the electrode function. The function of the diaphragm is based on the property that the shape of the diaphragm is deflected by an external force, but returns to the original shape when the external force is disengaged, and can also be said to be based on flexibility.

Hereinafter, the movable electrode having the shape of either the first form or the second form may be referred to as a "diaphragm electrode". Also, the term "movable electrode" is used, unless otherwise specified, to mean an electrode having any of the shapes of the first form and the second form.

The pressure of the fluid filled in the measurement chamber 115 is detected by applying a first potential (S1a) and a second potential (S1b) having a potential difference ($V_{IN}$) to the movable electrode 111 as a pulsed signal ΦD in a period t0 by the potential applying unit 122. The fixed electrode 110 is normally grounded to GND, but a predetermined potential (S2) may be applied by the potential applying unit 122.

The capacitance Cc is a parasitic capacitance of the fixed electrode 110, and its components mainly include a drain capacitance of the switch SW1, a gate capacitance of SF Amp, and a wiring capacitance.

When the first potential (S1a) and the second potential (S1b) are sequentially applied to the fixed electrode, a first signal (S2a) corresponding to the first potential (S1a) and a second signal (S2b) corresponding to the second potential (S1b) are outputted from the sensor head 100 and inputted from an input terminal ($IN_1$ to $IN_n$) to the signal processor 123 according to the capacitance (Cs) between the fixed electrode 110 and the movable electrode 111.

A first output signal ($V_{OUTN}$) in response to an input of the first signal (S2a) and a second output signal ($V_{OUTS}$) in response to an input of the second signal ($V_{OUTS}$) are output from the signal processor 123, respectively. When the first output signal ($V_{OUTN}$) and the second output signal ($V_{OUTS}$) are inputted to the difference signal generating means 125, a difference signal ($V_{OUT}$) is generated and outputted from the difference signal generating means 125.

Next, operation of the electrostatic capacitive pressure sensor ECPS of the present invention will be described with reference to FIGS. 1B and 1C.

A pulse signal ΦD represents a signal to which the first potential (S1a) and the second potential (S1b) are applied to the movable electrode 111 in the period to.

First, by turning ON-OFF a switch SW1, a fixed electrode reset pulse ΦR is applied to the fixed electrode (detection electrode) 110 to reset the fixed electrode 110. Thereafter, a pulse signal ΦD formed from the first potential (S1a) and the second potential (S1b) is applied to the movable electrode 111.

When the movable electrode 111 is at the first potential (S1a), the first output signal (VOUTN) is output while a sample-and-hold pulse ΦN is applied to the switch SW2N to turn it ON and OFF.

Similarly, when the movable electrode 111 is at the second potential (S1b), the second output signal ($V_{OUTS}$) is output while a sample-and-hold pulse ΦS is applied to the switch SW2S to turn it ON and OFF.

A difference signal (VOUT) is formed based on the difference between the first output signal (VOUTN) and the second output signal (VOUTS).

$$\text{Different signal } (VOUT) = \quad (3)$$
$$\text{First output signal } (VOUTN) - \text{Second output signal } (VOUTS)$$
$$= \frac{C_S}{C_S + C_C} V_{IN} G_{SF}$$

Here, $G_{SF}$ is the gain of SF Amp (Source Follower Amp).

Consequently, in the designed electric circuitry, it is possible to eliminate RN (Random Noise) and FPN (Fixed Pattern Noise) such as reset thermal noise and low frequency noise of the fixed electrode (detection electrode) 110, variations in the low frequency noise and threshold voltage of SF (Sauce Follower) transistor, and low frequency noise having a period longer than the period t0 included in the movable electrode (counter electrode) 111, the power supply, SF transistor and the column current source transistor, and thus a high-precision (high-resolution) and wide-dynamic range electrostatic capacitive pressure sensor can be realized.

Also, if an SF Amp is provided, charge-amplification can be performed with one transistor, and a signal with good linearity can be read out with a small area.

Next, the present invention will be described in detail.

FIGS. 2A to 2D show an exemplary embodiment of the present invention.

FIG. 2A is a schematic cross-sectional view in the line segment XY shown in FIG. 2C.

The capacitive sensor head 100 has a configuration in which a hermetic base 102 having an inverted concave protrusion shape is provided on a peripheral surface of the sensor base 101. An insulator 104 is provided on the sensor base 101 via spacers 103-1, 103-2 in a lower portion of an internal space (spare chamber) 114 of the hermetic base 102.

A space (spare chamber) 114 is provided for convenience of assembly in order to connect lead pins 106 and electrode pads 113 with lead wires 109, and is not essentially required in the present invention.

In order to connect the lead pins 106 and the electrode pads 113, springs may be used instead of the lead wires 109. In the method using the springs, since it is only necessary to mechanically insert the springs between the lead pins 106 and the electrode pads 113 by utilizing the elasticity of the springs, it is possible to avoid the troublesomeness of electrodeposition between the lead pins 106 and the lead wires 109, and between the lead wires 109 and the electrode pads 113, as in the method using the lead wires 109.

In addition, in the present invention, a method of directly connecting the lead pins 106 and the electrode pads 113 may be used.

On the upper side of the space (measurement chamber) 115 in the sensor base 101, as shown in FIG. 2A, a sensor diaphragm 105 having a flexible (displacement) region (region defining upper surface of the space 115) B is provided in the upper part of the sensor base 101 as an integral member with the sensor base 101 by processing the sensor base 101. That is, the lower surface of the flexible region B defines an upper surface of the space 115. The sensor diaphragm 105 is preferably provided as an integral member with the sensor base 101 as shown in FIG. 2A. In addition, it may be provided on the sensor base 101 as a structure separate from the sensor base 101 so that its peripheral portion is in close contact with the sensor base 101 so as to block the upper portion of the space 115.

It is preferable that the thickness of the sensor diaphragm 105 be as thin as possible within an allowable range of the mechanical strength, since it is possible to increase the accuracy of the pressure measurement if the thickness is thin.

Five electrode pads 113-1 to 113-5 (one of which is not shown in FIG. 2A and is shown in FIG. 2D) are disposed on the upper surface 104-2 of the insulator 104, and an insulator-side electrode (detection electrode/reference electrode) 110 is disposed on the lower surface 104-1. The insulator-side electrode 110 is a fixed electrode.

The illustrated insulator-side electrode 110 includes four detection electrodes 110-1 to 110-4 and a reference electrode 110-5 provided as necessary.

The reference electrode 110-5 is disposed at a position opposite to the surface of the non-flexible region C of the diaphragm electrode (movable electrode) 111 with a fixed gap interposed therebetween for zero point correction of pressure sensing. In FIG. 2B, a probe pin junction electrode pad 128 is interposed as needed.

The corresponding lead pins 106-1 to 106-5 are electrically connected to the electrode pads 113-1 to 113-5 via the corresponding lead wires 109-1 to 109-5, respectively.

The lead pins 106 and the probe pin 107 pass through the hermetic base 102 and communicate with the inside and outside of the hermetic base 102 while being sealed with the hermetic glass 108 to seal the gap with the hermetic base 102.

A surface electrode is coated on the inner surface of a through-hole 112-1, and the electrode pad 113-1 and the reference electrode 110-5 are electrically connected to each other.

In the same configuration and structure, the electrode pad 113-2, the third detection electrode 110-3, the electrode pad 113-3, the first detection electrode 110-1, the electrode pad 113-4, the second detection electrode 110-2, the electrode pad 113-5 (not shown), and the fourth detection electrode 110-4 are electrically connected to each other.

FIG. 2B shows an enlarged view of part A shown in FIG. 2A.

The insulator-side electrode 110 is provided on a surface 104-1 of the insulator 104 on the diaphragm 105 side, and the surface thereof may be covered with an insulating film 118 as necessary.

The diaphragm-side electrode 111 is provided on a surface 101-1 of the sensor base 101 on the insulator 104 side with an insulating film 117 interposed therebetween.

The probe pin 107 passes through the through hole 112-2 and is electrically connected to the diaphragm-side electrode 111. FIG. 2B shows electrical connection via an electrode pad 128, but in the present invention, the electrode pad 128 may be provided as needed and is not always necessary.

The space 114 and the space (reference chamber) 120 are communicated with each other through the through hole 112-2, and are in a reduced pressure state, preferably in a vacuum state, at least when the sensor head 100 is completed. The degree of vacuum at that time is appropriately determined in accordance with the pressure detection accuracy required for the sensor head 100 to be created. The detection accuracy depends on the movable characteristics (displacement characteristics) of the diaphragm 105 and the arrangement and shape of the insulator-side electrode 110, but the higher the vacuum degree, the higher the detection accuracy can be.

In addition, the space 114 and the space 120 may be filled with an inert gas such as nitrogen ($N_2$), argon (Ar), or helium (He) under reduced pressure.

The space 114 may be in communication with or blocked from the space 120, but it is advantageous that they are in communication since it is easier to place the space 120 in a reduced pressure or vacuum state when assembling the sensor head 100.

The space (measurement chamber) 115 is filled with a fluid to be measured (gas, liquid). The pressure of the fluid to be measured filled in the space 115 can be measured whether the fluid to be measured is in a dynamic state or a stationary state at the time of pressure measurement.

In the embodiment described in FIGS. 2A to 2D, the diaphragm 105 has the form of a circular plate. The diaphragm 105 includes an inner flexible surface 121-1 on the space 115 side, and an outer flexible surface 121-2 on the insulating film 117 side. The outer flexible surface 121-2 is part of the surface 101-1 of the sensor base 101 on the insulator 104 side. The outer flexible surface 121-2 and the inner flexible surface 121-1 constitute the upper and lower surfaces of the flexible (displacement) region B of the diaphragm 105, respectively.

The upper surface of the space 115 is defined by a flexible (displacement) region B (a region defining upper surface of the space 115) as shown in FIG. 2A.

The flexible (displacement) region B of the diaphragm 105 has the form of a circular plate, in the embodiment described in FIGS. 2A and 2B, and blocks the upper side of the space 115.

If the diaphragm 105 has a circular plate shape in which the center of the flexible (displacement) region B coincides with the center of the diaphragm 105 itself and the flexible (displacement) region B expands from this center isotropically in all directions, it is advantageous to be able to detect the pressure more accurately because it deforms isotropically and concentrically (hemispherically) under the pressure of the fluid.

In addition, the shape of the diaphragm 105 may be an elliptical plate shape or a polygonal plate shape in the case of a pressure sensor in which the accuracy of pressure detection is not strictly determined.

The detection electrodes 110 (four in the example illustrated in FIGS. 2A to 2D) are concentrically arranged on the diaphragm 105-side surface 104-1 of the insulator 104, corresponding to the surface of the movable (flexible) region B (the movable region B surface) of the diaphragm 105, with the center or the substantial center of the surface as a center point. In a case where a reference electrode 110-5 is provided, the reference electrode 110-5 is arranged on the outermost periphery.

"Substantial" of a "substantial center" as referred to herein refers to within the permissible range considered to be the center. The allowable range regarded as the center is appropriately determined in accordance with the measurement accuracy.

Hereinafter, the meaning of "substantial" as used herein without any specific mention is used in this sense. Also, hereinafter, the meaning of "center" is intended to include this "substantial center" as used herein without any particular mention.

In the example illustrated in FIG. 2C, four detection electrodes (110-1 to 110-4) are arranged on the surface 104-1, the first detection electrode 110-1 is arranged at the center of the surface, and the other three detection electrodes (110-2 to 110-4) are arranged concentrically around the first detection electrode 110-1. A reference electrode 110-5 is concentrically arranged on the outermost periphery.

In the embodiment illustrated in FIG. 2C, the first detection electrode 110-1 is disc-shaped, and is disposed on the surface 104-1 such that its center coincides with or substantially coincides with the center of the surface 104-1, but the shape of the first detection electrode 110-1 does not necessarily have to be disc-shaped. The shape of the first detection electrode 110-1 may be, for example, a plate-like doughnut shape.

In the embodiment shown in FIGS. 2A to 2D, the number of detection electrodes 110 is four (110-1 to 110-4), and as shown in FIG. 2C, the detection electrodes 110 are disposed on the front surface 104-1 of the insulator 104 on the diaphragm 105 side, but in the present invention, the number of detection electrodes 110 is not limited to four and may be one or more.

However, the larger the number of the detection electrodes 110, the higher the pressure detection accuracy, and thus, it is preferable to increase the number of the detection electrodes 110 as much as possible in the design allowable range. In addition, the number of detection electrodes 110 and the manner of arrangement thereof are determined according to the specifications, applications, and manufacturing costs of the pressure sensor to be obtained.

When the movable electrode 111 has the second configuration in which an electrode layer is separately provided on a surface of a conductive diaphragm, and an insulating intervening film is provided between the diaphragm and the electrode layer, a signal proportional to an applied voltage can be transmitted to the detection electrode by connecting a reference electrode (fixed electrode) 110-5 to the conductive diaphragm, and highly accurate detection with a higher S/N ratio can be performed.

The insulator 104 has a cylindrical shape having a surface 104-2 on the upper surface side (the surface on the lead-pin 106 side) and a surface 104-1 on the lower surface side (the diaphragm 105 side). In addition, it has a circular surface area large enough to cover the movable region B (circular in the example shown in FIGS. 1A to 1D) of the sensor diaphragm 105. That is, the insulator 104 has a circular surface with an area so large that the peripheral end region of the circular surface 104-1 can be placed (clamped) on the sensor base 101 via the ring-shaped spacer 103.

Since the insulator 104 is provided on the sensor base 101 via the spacer 103, the thickness (gap) of the space 120 can be provided with high accuracy, so the thickness (gap) of the space 120 can be narrowed, and the pressure can be detected with high accuracy.

When the space 114 and the space 120 are completely sealed in a vacuum state, an absolute pressure can be measured without being influenced by the temperature outside the sensor head 100.

The complete sealing of the space 114 and the space 120 is achieved, for example, by fitting the hermetic base 102 air-tightly to the sensor base 101 as shown. Alternatively, the hermetic base 102 and the sensor base 101 can be thermally welded with a semiconductor laser to completely seal the space 114 and the space 120.

The insulating film 118 is preferably provided on the insulator-side electrode (detection electrode/reference electrode) 110 in order to prevent an electrical short circuit caused by contact between the surface of the insulator-side electrode (detection electrode/reference electrode) 110 and the surface of the diaphragm-side electrode 111 during the movement of the sensor diaphragm 105 or due to an unexpected situation.

In the present invention, the insulating film 118 may not necessarily be provided depending on the specifications of the sensor head 100 to be formed.

As described above, by performing capacitance detection according to the capacitance detection method according to the present invention, it is possible to eliminate RN (random noise), FPN (fixed pattern noise) such as thermal noise and low frequency noise at the time of resetting the cell detection electrode (insulator-side electrode 110), low frequency noise and threshold voltage variation of SF transistor, and low frequency noise having a period longer than that of to included in the counter electrode (movable electrode) 111, the power supply, SF transistor, the column current source transistor, and the like, and pressure detection can be performed with high accuracy.

Next, one preferred example of IC sensor chip according to the present invention will be described.

FIGS. 3A to 3E are diagrams for describing one of preferred examples of IC sensor chip according to the present invention, wherein FIG. 3A is a schematic block-layout diagram of IC sensor chip, and FIG. 3B is a schematic enlarged view of part B shown by a frame in FIG. 1. FIG. 3C is a schematic circuit diagram, FIG. 3D is a timing diagram for explaining an exemplary drive timing, and FIG. 3E is a timing diagram for explaining the sampling timing of ADC.

Table 1 below shows the correspondence between the electrical PADs of IC tip 200 (hereinafter, also referred to as electrical "terminals" or "contacts") (No. 1~20) and the names. No. 1 to 5 indicate five terminals IN1 to IN5 corresponding to each of the five capacitance detection cells 201-1 to 201-5.

In the frame of the part B shown in FIG. 3B, five capacitance detection cells 201 (201-1 to 201-5) are provided with a cell pitch corresponding to the specification, for example, a cell pitch of 12 μm.

Eight dummy cells 208 (208-1a to 208-1h) are disposed around the capacitance detection cell 201 (201-1). The dummy cells 208 have the same configuration and structure as the capacitance detection cell 201s except that the capacitance detection cells 201 each has an input terminal but the dummy cells 208 each has a circuit configuration that does not have an input terminal and is installed at a fixed voltage (fixed potential) of a GND or a power supply.

As described above, by arranging the dummy cells 208 (eight in FIG. 3B) around the capacitance detecting cell 201, it is possible to reduce the measurement noises.

In a region adjacent to the lower portion of the dummy cells 208, there are provided transistor constant current circuits 209 each including a transistor TX2a, transistor TX3a serving as a constant current load of SF transistor TSF.

In an S/H capacitance cell region 210, there are collectively provided five S/H capacitance cells 202 (202-1 to 202-5) in which an S/H capacitance C1a and an S/H capacitance C2a are arranged in parallel.

In an output buffer amplifier region 211, two output buffer amplifiers 205-1 and 205-2 are provided. In a constant current power supply region 212, a constant current power supply 204 is provided.

In a horizontal shift register (HSR) region 213, a horizontal shift register (HSR) 206 is provided.

Next, a method of electrically driving the IC tip 200 when detecting a pressure with the sensor head 100 will be described with reference to FIGS. 3C to 3E.

FIG. 3C is a schematic circuit diagram of the IC tip 200 (part of the circuit is omitted).

FIG. 3D is a timing chart illustrating one preferred example of the driving timing of the IC tip 200.

The driving timing in the upper part of the drawing indicates the driving timing at which charges are accumulated (stored) in the capacitance C1 (C1a to C1e) and the capacitance C2 (C2a to C2e) of the S/H capacitance cells 202 (202-1 to 202-5). The driving timing in the lower part of the drawing indicates the driving timing of the horizontal shift register (HSR) 206.

FIG. 3E shows a specific example of the relation between shift register pulses and the output-signal.

In FIG. 3C, among the five capacitance detection cells 201-1 to 201-5, three capacitance detection cells 201-3 to 201-5 are indicated as " . . . " and their illustrations are omitted. Also, among the five S/H capacitance cells 202-1 to 202-5, three S/H capacitance cells 202-3 to 202-5 are also indicated as " . . . " and their illustrations are omitted.

As for the protection circuits 203, two protection circuits 203-1 and 203-2 are illustrated, but illustrations of the other three protection circuits 203-3, 203-4, and 203-5 are omitted.

Similarly, as for the constant current circuits 209, two constant current circuits 209-1 and 209-2 are illustrated, but illustrations of the other three constant current circuits 209-3, 209-4, and 209-5 are omitted.

Similarly, as for SF array circuits 214, the two SF array circuits 214-1 and 214-2 are illustrated, but illustrations of the other three SF array circuits 214-3, 214-4, and 214-5 are omitted.

Line 1 is connected to gate electrodes of five transistors TR1 to TR5 provided in five capacitance detection cells 201-1 to 202-5, respectively.

Line 3 is connected to gate electrodes of five transistors TX1a to TX1e provided in five SF array circuits 214-1 to 214-5, respectively.

Line 4 is connected to gate electrodes of five transistors TX2a to TX2e provided in five SF array circuits 214-1 to 214-5, respectively.

Line 5 is connected to gate electrodes of five transistors TX3a to TX3e provided in five SF array circuits 214-1 to 214-5, respectively.

In FIG. 3C, illustrations of the transistors TR2 to TR5, transistors TX1b to TX1e, transistors TX2b to TX2e, and transistors TX3b to TX3e are omitted.

Line 6 is connected to gate electrodes of five transistors TY1a to TY1e provided in five S/H capacitance cells 202-1 to 202-5, respectively.

The line 7 is connected to gate electrodes of five transistors TY2a to TY2e provided in five S/H capacitance cells 202-1 to 202-5, respectively.

In FIG. 3C, illustrations of transistors TY1b to TY1e, transistors TY2b to TY2e, transistors T1b to T1e, transistors T2b to T2e, capacitances C1b to C1e, and capacitances C2b to C2e are omitted.

When the space 120 of the pressure sensor 100 is filled with a fluid, and when an electric signal ΦD is input to a terminal IN1 of the capacitance detection cell 201-1, a predetermined quantity of electric charges corresponding to a displacement caused by the displacement of the diaphragm 105 is accumulated in a capacitance C1a and a capacitance C2a in S/H capacitance cell 202-1 at the driving timing shown in FIG. 3D. The ON/OFF of the transistor TR1 at that time is performed by inputting a signal ΦR to the terminal ΦR at the timing shown in FIG. 3D. When the transistor TX1a is turned ON/OFF, a current flows through the transistor TX2a and the transistor TX3a, and the transistor TSF is turned ON/OFF. The ON/OFF of the transistor TX1a is performed by inputting a signal ΦX to the terminal ΦX at the timing shown in FIG. 3D. The accumulation of charges in the capacitance C1a is performed by turning ON/OFF the transistor TY1a at the timing of inputting a signal ΦN to the terminal ΦN shown in FIG. 3D. Similarly, the accumulation of charges in the capacitance C2a is performed by turning ON/OFF the transistor TY2a at the timing of inputting a signal ΦS to the terminal ΦS shown in FIG. 3D.

Many conventional technologies detect a capacitance by measuring a current flowing when a high-frequency AC signal is applied, and it is difficult to eliminate an effect of distortion of the signal due to a phase difference of charging and discharging and a response delay of a detecting circuit during signal sampling, but according to the driving method which is one specific example of the present invention, since the signal charge can be accumulated in the capacitances C1a and C2a at the time when the output signal of the transistor TSF corresponding to the first potential and the second potential applied to the diaphragm is stabilized, a highly accurate signal can be easily obtained.

TABLE 1

| PAD NO | Symbol | Name of Electrical PAD (Terminal/Contact) |
| --- | --- | --- |
| 1 | IN1 | Cell 1 input |
| 2 | IN2 | Cell 2 input |
| 3 | IN3 | Cell 3 input |
| 4 | IN4 | Cell 4 input |
| 5 | IN5 | Cell 5 input |
| 6 | ONTS | Output signal when diaphragm electrode (movable electrode) is at second potential |
| 7 | ONTN | Output signal when diaphragm electrode (movable electrode) is at first potential |
| 8 | VSS | GND |
| 9 | VDD | Power supply |
| 10 | VR | Cell detection electrode reset power supply |
| 11 | VSUB | Silicon substrate voltage (without PAD) |
| 12 | ΦN | Sample-hold pulse of the cell output signal when diaphragm electrode (movable electrode) is at first potential |
| 13 | ΦS | Sample-hold pulse of the cell output signal when diaphragm electrode (movable electrode) is at second potential |
| 14 | ΦR | Cell electrode reset pulse |
| 15 | ΦX | Cell source follower constant current ON/OFF pulse |
| 16 | ΦHR | Shift register reset pulse |
| 17 | ΦHS | Shift register start pulse |
| 18 | ΦHC | Horizontal shift register clock pulse |
| 19 | VBIS | Constant current source reference voltage |
| 20 | VREF | Signal readout line reset voltage |

Since the electric signal ΦD is input to the terminal IN1 and input to the terminals IN2 to IN5 at the same time, the electric signal ΦD is similarly accumulated in capacitances of the S/H capacitance cells 202-2 to 202-5 corresponding to the capacitance C1a and the capacitance C2a.

By turning ON/OFF the transistors T1a to T1e connected to the output of an HSR (horizontal shift register) 206 driven by a signal ΦHR input to a terminal ΦHR at the timing shown in FIG. 3D, signals corresponding to the amounts of charges accumulated in each of the capacitances C1a to C1e are sequentially output as a signal OUTN from a terminal OUTN through a line 10.

Similarly, by turning ON/OFF transistors T2a to T2e connected to the output of the HSR 206 driven by a signal ΦHS input to a terminal ΦHS at the timing shown in FIG. 3D, signals corresponding to the amounts of charges accumulated in the capacitances C2a to C2e are sequentially output as signals OUTS from the terminal OUTS through the line 9.

Next, the sampling timing of ADC (analog-to-digital converter) will be described.

FIG. 3E is a timing chart for describing one example of ADC sampling timing, and shows the timing relation of a shift register pulse and an output-signal.

In the example shown in FIG. 3E, ADC sampling is performed between 100 ns after the rise of the horizontal shift register clock pulse ΦHC and 50 ns before the fall.

By setting the timing in such a relation, AD conversion can be performed with high precision at a time when the signal outputted from the IC chip 200 is stable without being affected by the time delay of the signal that occurs in the IC chip 200.

The timing of FIGS. 3D and 3E is an example in which the signals obtained from the five detection electrodes are output every 20 μs, that is, 50,000 times per second, but is not necessarily limited thereto. Further, for example, when it is only necessary to obtain a signal at a period of 1000 times per second, it is possible to use a signal obtained by averaging 50 outputs, thereby further improving the detection accuracy.

Next, other preferred embodiments of the shape and arrangement of the detection electrodes in the sensor head according to the present invention will be described.

FIG. 4 is a schematic explanatory view for explaining other preferred embodiments of the shape and arrangement of the detection electrodes in the sensor head according to the present invention.

In the example of (A) in FIG. 4, nine detection electrodes are provided, in the example of (B) in FIG. 4, seven detection electrodes are provided, and in the example of (C) in FIG. 4, two detection electrodes are provided.

In any of the examples of (A) to (C) in FIG. 4, the reference electrode (No. 10, 8, 3) is arranged in a ring shape at the outermost periphery, and the detection electrode of No. 1 is arranged in a circular shape at the center.

With respect to the detection electrodes other than No. 1, in both (A) and (B) in FIG. 4, two ring-shaped electrodes are provided on the outer side of the detection electrode of No. 1 concentrically with the detection electrode of No. 1, and in the case of (A) in FIG. 4, these ring-shaped electrodes are each divided into four to arrange eight detection electrodes No. 2 to 9, and in the case of (B) in FIG. 4, they are each divided into three to arrange six detection electrodes No. 2 to 7.

In the case of (C) in FIG. 4, a ring-shaped detection electrode of No. 2 is arranged concentrically with the detection electrodes of No. 1 on the outer side of the detection electrodes of No. 1.

A plurality of detection electrodes has been provided in the above-described examples, but in the present invention, the detection electrodes is not limited to be plural, but may be singular, and the shape and arrangement thereof are not limited to the above description. However, as shown in FIG. 4, by dividing ring-shaped electrode(s) into plural and providing them, it is possible to reduce the parasitic capacitance of the detection electrodes, it is possible to detect the deformation amount of the diaphragm of the peripheral portion even after the diaphragm is greatly deformed and the deformation of the central portion is limited, and it is possible to thereby achieve high sensitivity and dynamic range enlargement. Accordingly, the larger the number of divisions, the more effective the measurement can be achieved.

Some of the preferred examples of the embodiments of the present invention and their modifications explained so far have been described as examples of electrostatic capacitive pressure sensors related to manufacturing of semiconductors, but the application of the electrostatic capacitive pressure sensor of the present invention is not limited thereto, and can be applied to, for example, bedsore detection sensors and excreted urine amount detection sensors in nursing care, pressure sensors used at manufacturing sites of food processing, beverage manufacturing or chemical liquid manufacturing that use fluid.

The present invention is not limited to the above embodiments, and various modifications and deformations can be made without departing from the concept and scope of the present invention. Accordingly, the following claims are appended to disclose the scope of the invention.

REFERENCE SIGNS LIST 1 to 10, 2-1, 2-2: Line
100: Sensor head
101: Sensor base
101-1: Insulator 104 side surface of sensor base 101
102: Hermetic base
103-1, 103-2: Spacer
104: Insulator
104-1: Diaphragm 105 side surface of insulator 104
104-2: Lead-pin 106 side surface of insulator 104
105: (Sensor) Diaphragm
106 (106-1 to 106-4): Lead pin
107: Probe pin
108 (108-1, 108-2): Hermetic glass
109 (109-1 to 109-4): Lead wiring
110: Insulator-side electrode (fixed electrode: detection electrode/reference electrode)
110-1 to 110-4: Detection electrode
110-5: Reference electrode
111: Diaphragm-side electrode (movable electrode)
112-1: Through hole (inner surface electrode coating)
112-2: Through hole
113 (113-1 to 113-4): Electrode pad
114: Space (spare chamber)
115: Space (measurement chamber)
116: Space gap d
117, 118: Insulating film
119: Electrode pad
120: Space (reference chamber)
121-1: Inner movable surface
121-2: Outer movable surface
122: Potential applying unit
123: Signal processing unit
124: Input port IN1 to $IN_n$
125: Difference signal generating means
126: Fluid
127: Capacitance detection circuit
128: Probe pin junction electrode pad
200: IC tip
201 (201-1 to 201-5): Capacitance detection cell
202 (202-1 to 202-5): S/H capacitance cell
203 (203-1 to 203-5): Protection circuit
204: Constant current power supply
205 (205S, 205N): Output buffer amplifier
206: Horizontal shift register (HSR)
207-1 to 207-3: Terminal
208 (208-1a to 208-5a, 208-1h to 208-5h): Dummy cell
209 (209-1 to 209-5): Constant current circuit
210: S/H capacitance cell region
211: Output buffer amplifier region
212: Constant current power supply region
213: Horizontal shift register (HSR) region
214 (214-1 to 214-5): SF array circuit
400: Sensor head
401: First chamber
402: Second chamber
403: First electrode
404: Second electrode
405: Support disk
406: Reference inlet
407: Inlet
408: Outlet
409: Substrate
410: First spacer
411: Second spacer

The invention claimed is:

1. An electrostatic capacitive pressure sensor comprising a fixed electrode and a movable electrode which is arranged opposite to the fixed electrode and deflects in accordance with a pressure of a fluid; a reference chamber provided between the electrodes; and a measurement chamber filled with the fluid for causing deflection of the movable electrode, the electrostatic capacitive pressure sensor configured to measure the pressure of the fluid by directly converting an amount of change in a capacitance between both electrodes that changes in accordance with a movable displacement of the movable electrode to an electric signal, the electrostatic capacitive pressure sensor further configured to:

sequentially apply a first potential and a second potential to the movable electrode and generate a first output signal corresponding to the first potential and a second output signal corresponding to the second potential; and generate a difference signal between the first output signal and the second output signal.

2. The electrostatic capacitive pressure sensor according to claim 1, wherein the movable electrode is formed on an insulating layer.

3. The electrostatic capacitive pressure sensor according to claim 1, wherein an insulating film is provided on a surface of the fixed electrode.

4. A fluid pressure detection method using an electrostatic capacitive pressure sensor comprising a fixed electrode and a movable electrode which is arranged opposite to the fixed electrode and deflects in accordance with a pressure of a fluid, a reference chamber provided between the electrodes, and a measurement chamber filled with the fluid for causing deflection of the movable electrode, the electrostatic capacitive pressure sensor configured to measure the pressure of the fluid by directly converting an amount of change in a capacitance between both electrodes which changes in accordance with a movable displacement of the movable electrode to an electric signal, the method comprising:
filling the measurement chamber with a pressure detection fluid;
sequentially applying a first potential and a second potential to the movable electrode;
generating a first output signal corresponding to the first potential and a second output signal corresponding to the second potential;

generating a difference signal between the first output signal and the second output signal; and detecting a pressure of the pressure detection fluid based on the difference signal.

\* \* \* \* \*